(12) United States Patent
Reiter et al.

(10) Patent No.: US 8,148,955 B2
(45) Date of Patent: Apr. 3, 2012

(54) MOTOR VEHICLE

(75) Inventors: Tomas Reiter, Munich (DE); Hartmut Proebstle, Augsburg (DE); Dieter Polenov, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 345 days.

(21) Appl. No.: 12/478,275

(22) Filed: Jun. 4, 2009

(65) Prior Publication Data

US 2009/0302807 A1 Dec. 10, 2009

(30) Foreign Application Priority Data

Jun. 5, 2008 (DE) .......................... 10 2008 027 062

(51) Int. Cl.
*H02J 7/00* (2006.01)
(52) U.S. Cl. ........................................ 320/166; 320/117
(58) Field of Classification Search .................. 320/104, 320/166, 167, 126; 324/425–437; 180/65.29
See application file for complete search history.

(56) References Cited

U.S. PATENT DOCUMENTS
3,546,568 A * 12/1970 Groom et al. ................ 323/351

FOREIGN PATENT DOCUMENTS
WO  WO 2008/014944 A1  2/2008
* cited by examiner

*Primary Examiner* — Huy Q Phan
*Assistant Examiner* — Alesa Allgood
(74) *Attorney, Agent, or Firm* — Crowell & Moring LLP

(57) ABSTRACT

A motor vehicle includes an on-board vehicle electric system, an electric consumer, whose resistance decreases with the decreasing voltage dropping at the consumer, an electric energy accumulator, and a switching arrangement. The switching arrangement is designed and is connected or connectable to the on-board vehicle electric system, the consumer and the energy accumulator such that in a first switching position, the energy accumulator, and in a second switching position, the switching arrangement, is connected in parallel to the on-board vehicle electric system. The energy accumulator in the second switching position is connected in series to the consumer, and the energy accumulator in the first switching position is not connected in series to the consumer.

20 Claims, 4 Drawing Sheets

MOTOR VEHICLE

CROSS-REFERENCE TO RELATED APPLICATION

This application claims priority under 35 U.S.C. §119 to German Patent Application No. 10 2008 027 062.8, filed Jun. 5, 2008, the entire disclosure of which is herein expressly incorporated by reference.

BACKGROUND AND SUMMARY OF THE INVENTION

The invention relates to a motor vehicle.

The peak performance and the stability of the on-board vehicle power system can be enhanced by way of a parallel connection of the energy accumulators in the on-board vehicle power system. For example, WO 002008014944 A1 discloses the installation of capacitive energy accumulators, such as double layer capacitors, in parallel with the on-board vehicle power system, in order to stabilize the voltage of the on-board vehicle electric system. Large capacitive energy accumulators, such as double layer capacitors, have to be charged by way of a pre-charging circuit to approximately the voltage of the on-board vehicle electric system, before these double layer capacitors can be coupled to the on-board vehicle power system. In this way, it is possible to avoid high compensating currents that could result in damage to the energy accumulators (as well as the leads) or may result in unacceptable voltage lapses in the on-board vehicle power system. Usually bi-directional direct voltage transformers are used in order to pre-charge, as well as discharge, the double layer capacitors. The conversion and integration of the direct voltage transformers usually requires a considerable financial outlay and technical complexity. In addition, the use of clocked direct voltage transformers conceals such risks as EMC interference. Furthermore, the direct voltage transformers for charging and discharging an energy accumulator are usually in the deactivated state and have to be designed, nevertheless, for high performance, in order to increase the system availability of the supporting measures of the on-board vehicle electric system by use of additional energy accumulators.

The ageing of double layer capacitors is primarily a function of the temperature and the polarization voltage. In order to extend the life of the energy accumulators, the following operating strategy, on which the invention is based, is targeted, for example, at this point.

In the off state of the vehicle (no stabilization of the on-board vehicle electric system is necessary), the double layer capacitor is separated from the on-board vehicle electric system and discharged. No special requirements are placed on the speed of the discharging process, since the immobilization phase is usually longer than the discharging process (average immobilization time approximately 8 hours, discharging of a 100 F stack by 5 V in 10 min. requires a discharging current of less than 1 A). The lower polarization voltage in the immobilization period leads to a longer lifespan of the double layer capacitor.

When the vehicle is awakened (for example, opening the door), it can be assumed that the double layer capacitor will be needed in a short period of time as the energy accumulator that stabilizes the on-board vehicle electric system, for example, for an engine start that follows shortly thereafter. When the double layer capacitor cannot be connected yet in parallel to the on-board vehicle electric system owing to the negligible polarization voltage (unacceptably high compensating currents), and, hence, the function of the on-board vehicle electric system stabilization is not yet available, the result may be, for example, in the case of an engine start, a function limitation or failure of customer-relevant functions (flickering of lights, failure of radio and navigation system). Therefore, a high, but limited charging current is required for the double layer capacitor in order to achieve a fast function availability, so that the double layer capacitor is charged, for example, to the voltage of the on-board vehicle electric system within one minute. Thus, for example, the system disclosed in WO 002008014944 A1 proposes the use of a voltage transformer having a charging current of approximately 50 A.

A long pre-charging period of the double layer capacitor means a limited function availability and significantly reduces the use of the on-board vehicle electric system expansion. A short pre-charging period means a high degree of sophistication in the pre-charging circuit. The result of pre-charging over a plurality of switchable power resistors is usually a long pre-charging period. Therefore, this possible solution is ruled out.

Pre-charging over power resistors having different values in order to shorten the pre-charging period requires a considerable degree of sophistication for the switches and power resistors. In addition, the waste heat, which a power resistor generates, is noticeable. This can lead to thermal problems in the installation space (ageing of the energy accumulators at high temperatures).

The present invention is based on the problem of providing a motor vehicle that is improved over the state of the art.

This problem is solved by a motor vehicle having an on-board electric system, an electric consumer, whose resistance decreases over at least a subrange with the decreasing voltage dropping at the consumer, an energy accumulator, and a switching arrangement. The switching arrangement is designed and is connected or connectable to the on-board vehicle electric system, the consumer and the energy accumulator such that in a first switching position, the energy accumulator and, in a second switching position, the switching arrangement, is connected in parallel to the on-board vehicle electric system. The energy accumulator in the second switching position is connected in series to the consumer and the energy accumulator in the first switching position is not connected in series to the consumer. Advantageous further developments of the invention are described herein.

The invention is based on the idea of pre-charging, in particular, a capacitive energy accumulator by way of a consumer, whose resistance decreases with the decreasing voltage, dropping at the consumer, over at least a subrange, in particular over at least a subrange (preferably at least 20%, at least 30%, at least 40% or at least 50%) of the pre-charging period or over at least a subrange (preferably at least 20%, at least 30%, at least 40% or at least 50%) of the pre-charging voltage range. In this way, a high, relatively uniform, pre-charging current can be achieved at negligible cost. Hence, a fast and reliable pre-charging of the energy accumulator can be achieved.

A preferred motor vehicle includes an on-board vehicle electric system with an electric consumer, whose resistance over at least a subrange decreases with the decreasing voltage, dropping at the consumer, with, in particular, a capacitive energy accumulator (accumulator for electric energy), such as a capacitor, especially a double layer capacitor or a battery, in particular a lithium ion battery. The energy accumulator is, in particular, an additional energy accumulator which is provided, in addition to the actual energy accumulator of the on-board vehicle electric system, especially to support the on-board vehicle electric system. A switching arrangement is designed and connected or connectable to the on-board vehicle electric system, the consumer and the energy accumulator in such a way that in a first switching position, the energy accumulator, and in a second switching position, the switching arrangement is connected in parallel to the on-board vehicle electric system. The energy accumulator in the second switching position of the switching arrangement is connected in series to the consumer, and the energy accumulator in the first switching position of the switching arrangement is not connected in series to the consumer.

In this way, the energy accumulator and/or the on-board vehicle electric system can be switched into a normal operating state by switching the switching arrangement into the first switching position and can be switched into the pre-charge operating state by switching the switching arrangement into the second switching position. In the normal operating state, the on-board vehicle electric system is supported by the pre-charged energy accumulator. In the pre-charge operating state, the energy accumulator is pre-charged by the on-board vehicle electric system. In this case, however, the current is limited by the resistance of the consumers, especially in such a manner that the pre-charging current is relatively constant, in particular more constant than with the use of a simple power resistor for limiting the pre-charging current.

The resistance characteristic of the consumer is preferably non-linear and runs especially in such a way that the consumer current is limited to an allowable maximum value—for the energy accumulator, the on-board vehicle electric system and/or the connections. Preferably, the result is the effect of the decreasing resistance—with the decreasing voltage, dropping at the consumer—owing to a cooling down of the consumer.

The consumer is used preferably for the purpose of implementing an additional vehicle-related function (besides the current limiting function in the pre-charge operating state). As a result, in particular, the hardware related complexity that is required to implement the invention can be reduced.

It has been proven to be especially advantageous to use a consumer, which includes a heater, in particular a rear windshield heater or a front windshield heater, or which is a part of a heater, because such a consumer is already present in the motor vehicle. The resistance of such a consumer is preferably non-linear, so that the consumer current is limited to an allowable maximum value for the energy accumulator of the on-board vehicle electric system and the connections, and then the resistance decreases with the decreasing voltage, dropping at the consumer, in particular owing to the cooling down of the consumer due to PTC characteristics (positive temperature characteristics). Moreover, the resistance of such a consumer is dimensioned or dimensionable such that it is suitable for limiting the pre-charging current in the concerned energy accumulator.

Preferably, the energy accumulator in a third switching position of the switching arrangement is separated from the on-board vehicle electric system. In this state, for example, the energy accumulator can be discharged.

The switching arrangement, which is triggered preferably directly or indirectly by a vehicle wake-up signal, is switched into the second switching position. The vehicle wake-up signal can be generated, for example, by blocking open or opening a vehicle door.

As an alternative or in addition, the switching arrangement, which is triggered directly or indirectly by a vehicle sleep signal, is switched into the third switching position. The vehicle sleep signal can be generated, for example, by locking or closing the vehicle doors.

The invention provides, in particular, preferably that the switching arrangement, which is triggered directly or indirectly by a charging of the energy accumulator beyond a predetermined limit value, is switched into the first switching position. Hence, the motor vehicle or the on-board vehicle electric system is switched from the pre-charge operating state into the normal operating state, when the energy accumulator is sufficiently pre-charged.

Owing to an advantageous second switching unit (consumer switching unit), the consumer can be connected in parallel to the on-board vehicle electric system, especially even when the first switching unit is switched into the first or third switching state.

The two switching units are driven preferably in such a manner that the consumer is not connected in parallel to the on-board vehicle electric system simultaneously by the two switching units.

A consumer function indicator is activated preferably only if the consumer is activated by an expressed function request of the user with respect to the consumer. Preferably, the consumer function indicator is activated only if the consumer is connected in parallel to the on-board vehicle electric system by way of the second switching unit (consumer switching unit), because only in this case is there a function request (that is expressed by a closing of the second switching unit (consumer switching unit)) of the user with respect to the consumer. The function of the consumer in the pre-charge operating mode is not intended by the user and is, therefore, not indicated to the user. If a pre-charge operating mode takes place and the user expresses a function request to the consumer, then this consumer is already activated (function fulfillment) and is also correspondingly indicated. Therefore, a consumer function display, which is coupled directly to the function request of the user, is advantageous.

In addition, a preferred further development provides an especially unidirectional direct voltage transformer for the purpose of discharging the energy accumulator.

The consumer is designed preferably so as to be spatially separated from the energy accumulator so that during the pre-charging phase no waste heat of the consumer is dissipated into the installation space of the energy accumulator—a feature that could have a negative impact on the performance of the energy accumulator.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
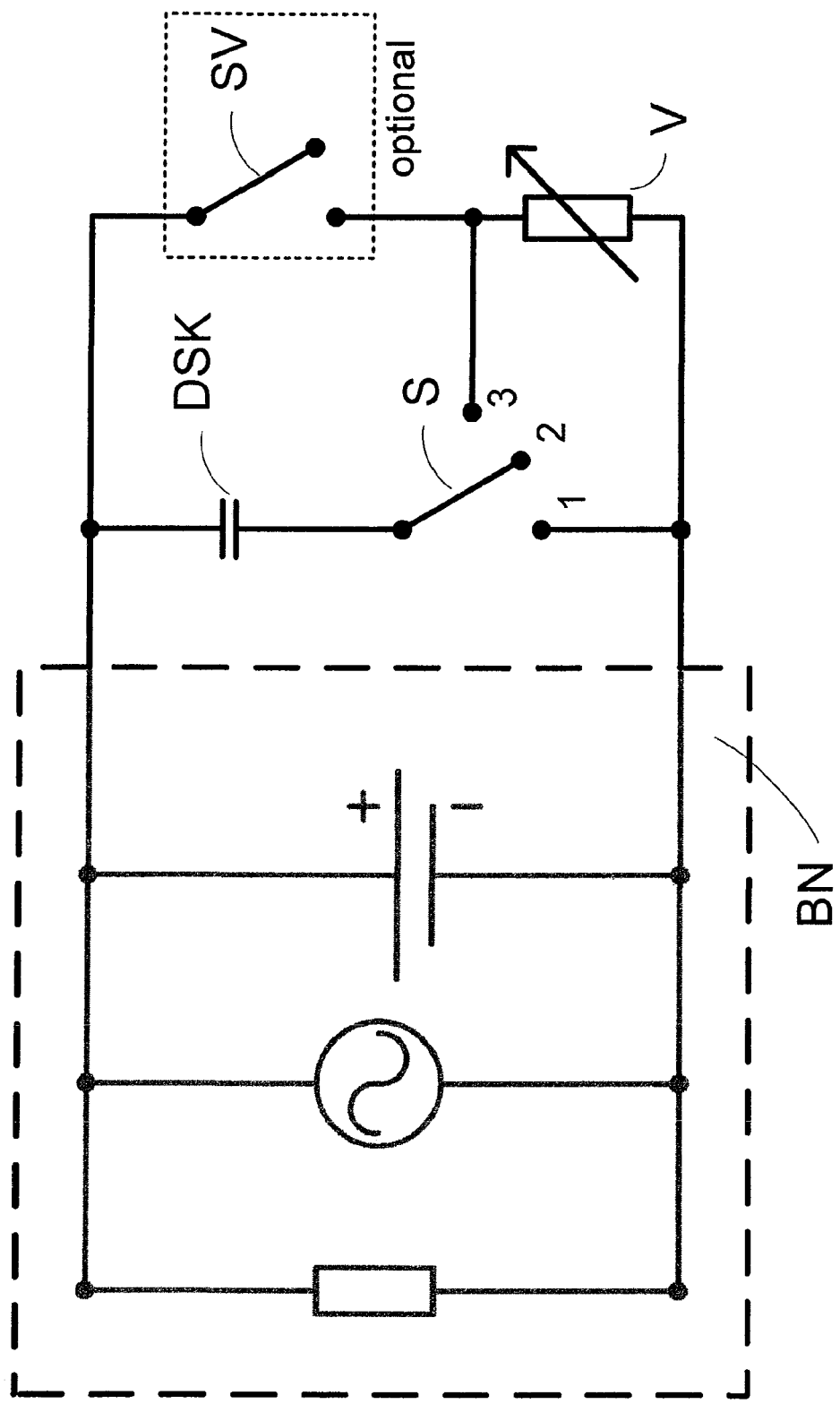
FIG. 1 is a simplified circuit diagram of a part of a motor vehicle.

FIG. 1 shows that part of a motor vehicle that is relevant for understanding the invention; this part including an on-board vehicle electric system BN, an electric energy accumulator DSK, in particular a double layer capacitor, and an electric consumer V, in particular a rear windshield heater. The electric consumer has a resistance that is non-linear and decreases with a decreasing voltage, dropping at the consumer. The on-board vehicle electric system BN usually consists of a generator, an energy accumulator, and various loads.

A switching arrangement S is designed and coupled to the on-board vehicle electric system BN, the consumer V and the energy accumulator DSK such that, in a first switching position 1, the energy accumulator DSK and, in a second switching position 3, the switching arrangement S is connected in parallel to the on-board vehicle electric system BN. The energy accumulator DSK in the second switching position 3 is connected in series to the consumer V (pre-charge operating state), and the energy accumulator DSK in the first switching position 1 is not connected in series to the consumer V (normal operating state). In a third switching position 2 of the switching arrangement S, the energy accumulator DSK is separated from the on-board vehicle electric system BN. Owing to the second switching unit SV, the consumer V is connectable in parallel to the on-board vehicle electric system BN, and in this way, for example, the rear windshield heater can be activated.

The use of such a device makes possible a limited pre-charging current during the pre-charging phase of a capacitive energy accumulator, such as a double layer capacitor, without having to install a voltage transformer as the energy flow actuator. The energy accumulator DSK is connected selectively in parallel to the on-board vehicle power system BN by means of the change-over switch S, separated from the on-board vehicle electric system BN, or connected to a consumer in the on-board vehicle power system, which consumer exhibits a non-linear impedance characteristic, in particular a PTC (positive temperature coefficient) characteristic, in order to limit the current flow (energy flow) and, in so doing, to achieve, nevertheless, the requisite pre-charging current over the entire pre-charging state. A thermal input of heat into the installation space of the energy accumulator DSK by the charging current limiter is avoided, when an externally existing consumer, such as a rear windshield heater, is used as a charging current limiter.

Especially advantageous is the use of consumers with PTC characteristic, such as a rear windshield heater, as the charging current limiter.

Owing to the PTC characteristic of the consumer, the resistance value decreases as the temperature drops and, thus, also as the voltage, dropping at the consumer, decreases. As a result, in the event of small voltage differences of the energy accumulator in relation to the on-board vehicle electric system, a high charging power is possible, for example, when the rear windshield heater is cold, or owing to a decreasing current flow and, thus, decreasing charging power, becomes colder. Therefore, the choice of the rear windshield heater as the consumer is also advantageous, because a user will not notice the activation (which is not really desired by the user) of the rear windshield heater just for the purpose of limiting the current.

Figure 2:
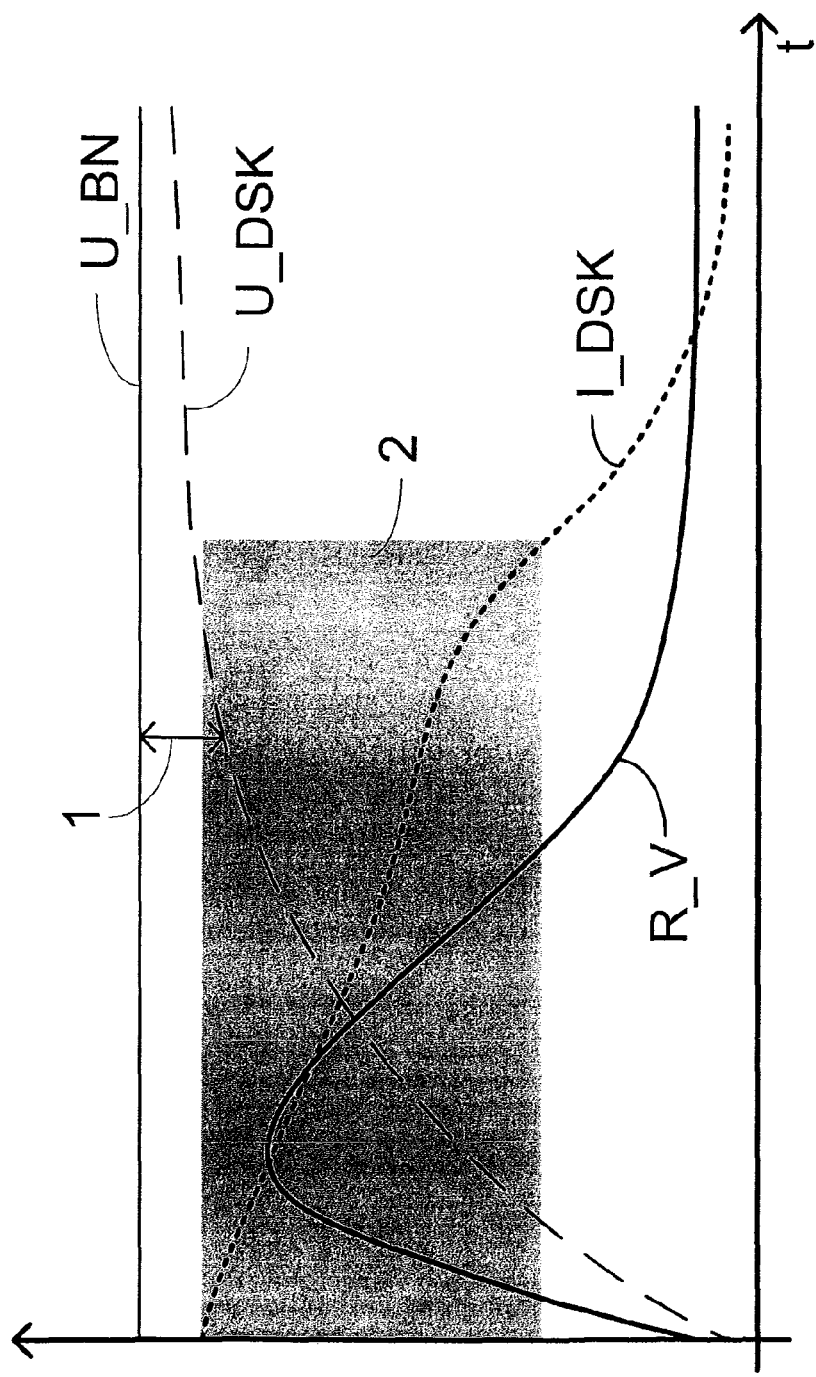
FIG. 2 is a graph showing, in simplified form, the variation over time of the physical variables in a motor vehicle.

FIG. 2 shows, as an example, the variation over time of the relevant electric variables during a charging event in connection with the above-described device. It is the on-board vehicle electric system voltage U_BN, the voltage of the double layer capacitor U_DSK, the maximum allowable additional voltage difference 1 and the charging current of the double layer capacitor I_DSK, which is produced by the non-linear time characteristics of the resistance R_V. The time characteristics of the resistance R_V show, after an initial rise in the resistance over a wide subrange, a resistance that decreases as the decreasing voltage drops at the consumer.

The demanded charging current range is marked with the reference numeral 2. Thus, pre-charging up to the allowable additional voltage difference 1 is in the demanded range (faster pre-charging) owing to the non-linear characteristic (PTC) of the consumer. As a result, there is a high function availability of the on-board vehicle electric system expansion.

Figure 3:
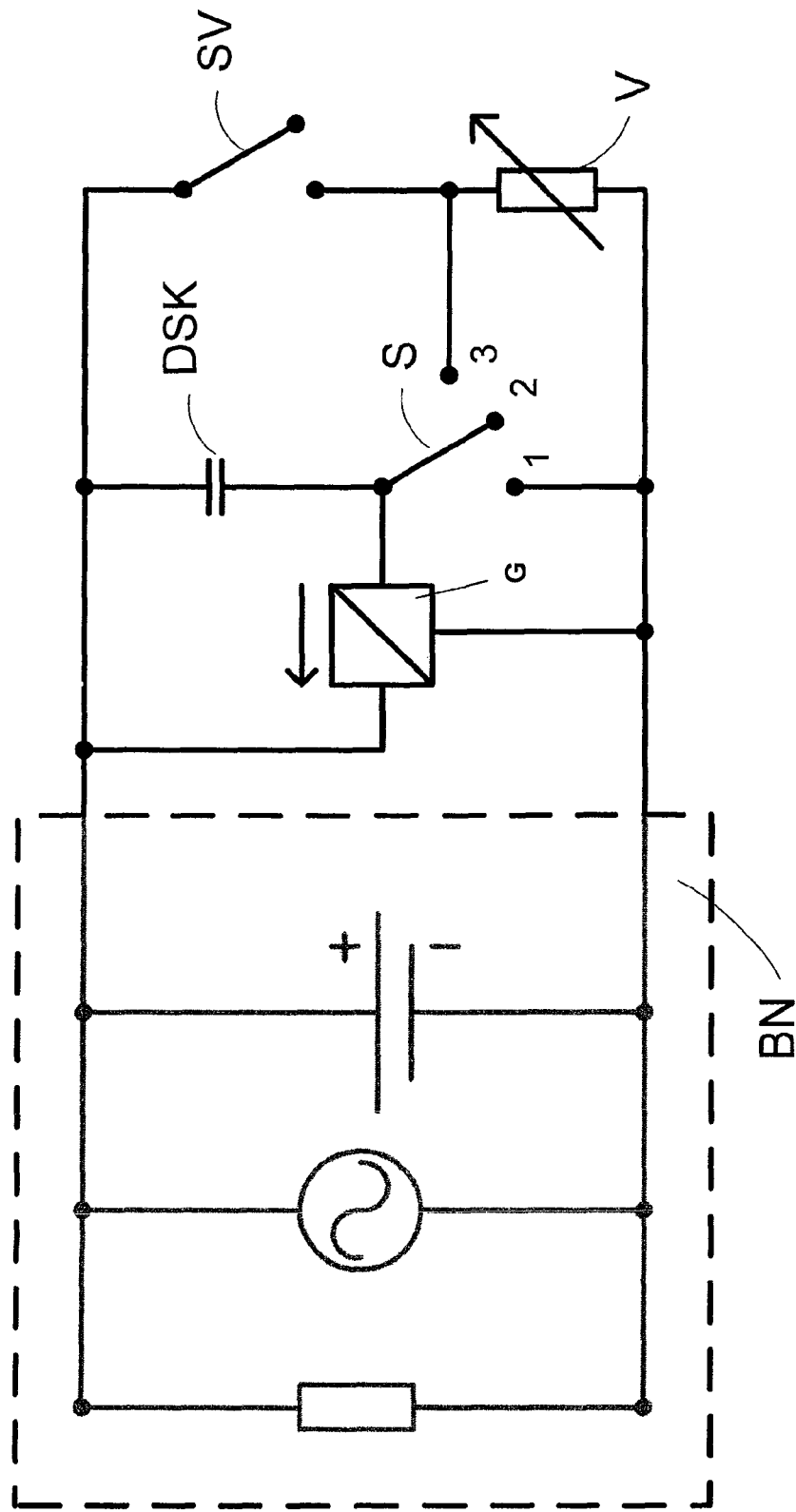
FIG. 3 is a simplified circuit diagram of a part of a motor vehicle.

The major distinction between the system shown in FIG. 3 and the system in FIG. 1 is a direct voltage transformer G for discharging the energy accumulator DSK, for example, before maintenance and service work on the on-board vehicle electric system. In this case, it is advantageous that the direct voltage transformer can be designed so as to be unidirectional.

In addition, the demands on the system availability relate chiefly to the charging case. The discharging can take place slowly, as a result of which the performance of the direct voltage transformer can be low.

Figure 4:
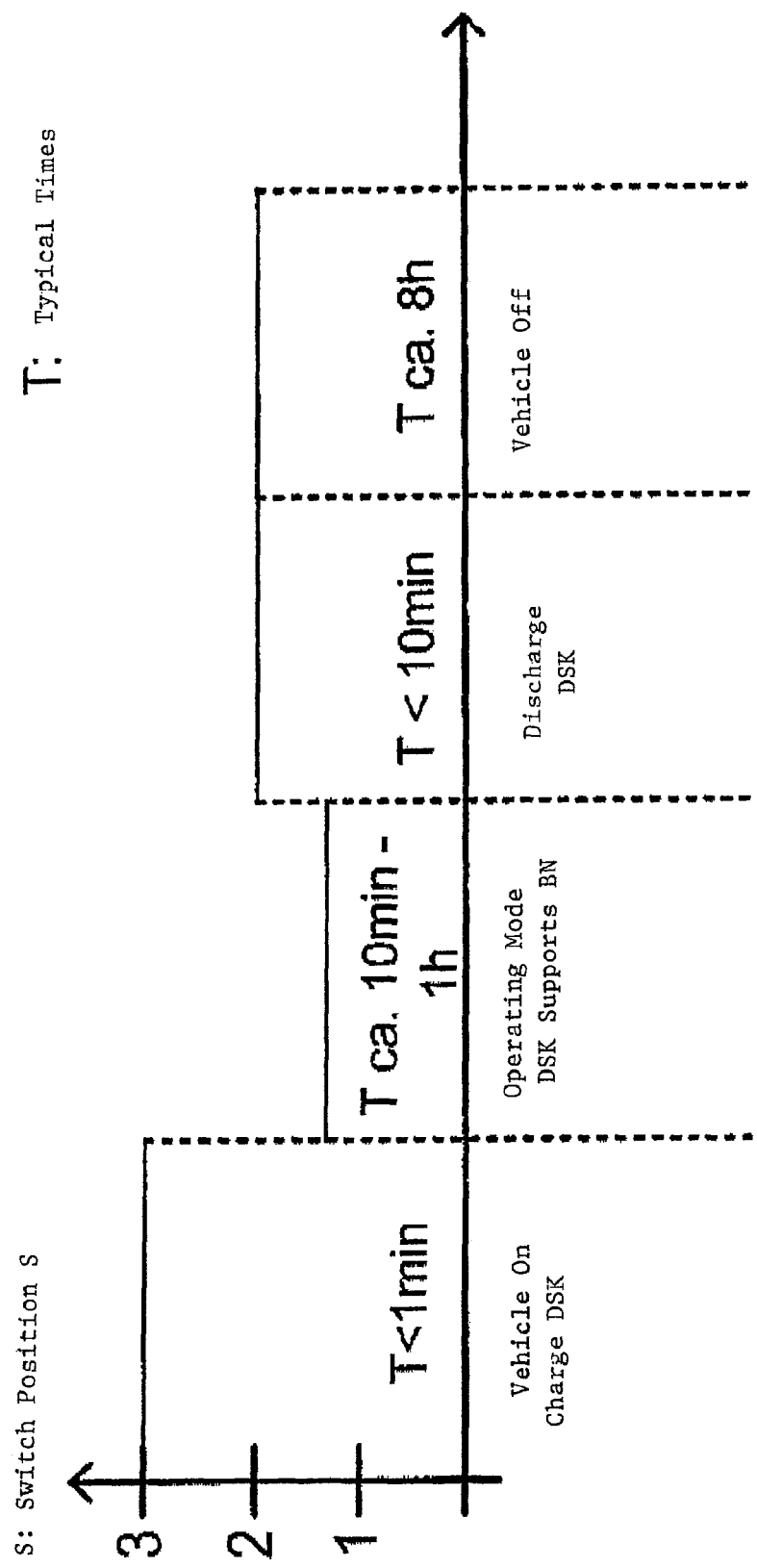
FIG. 4 is a graph showing the variation over time of the switching position of a switching arrangement.

FIG. 4 is an example showing variation over time of the switching state of the switching arrangement S.

First of all, the switching arrangement S is switched into the second switching position 3 by way of a vehicle wake-up signal. Then, in the pre-charging operating state, the energy accumulator is charged.

Owing to the charging up of the energy accumulator DSK beyond a predetermined limit value or after a defined period of time, the switching arrangement S is switched into the first switching position 1. Then, in the normal operating state, the on-board vehicle electric system is supported by the energy accumulator.

The switching arrangement S is switched into the third switching position 2 by way of a vehicle sleep signal. In this switching position the energy accumulator is discharged.

In addition, the operating strategy of the rear windshield heater is adapted as follows, in order to be able to use it additionally as a pre-charging circuit.

The customer request "rear windshield heater ON" (equivalent to a request to close the switch SV) may not be carried out, if the rear windshield heater is already being used for pre-charging the double layer capacitor, because the switching arrangement S in the switching position 3 and closed switch SV would result in a short circuit of the double layer capacitor. However, there is no function limitation or non-fulfillment of the customer request, because during the function "double layer capacitor pre-charging" the rear windshield heater is already activated and, hence, the customer request is fulfilled. In this context, it is advantageous to couple the function display (rear windshield heater ON) to the customer request (function key position) and not to the function of the rear windshield, because otherwise the customer could interpret the activity of the rear windshield in its function as a pre-charging circuit as an implausible behavior.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A motor vehicle, comprising:
an on-board vehicle electric system;
an electric consumer having a resistance which decreases over at least a subrange with a decreasing voltage dropping at the consumer;
an energy accumulator; and a switching arrangement operatively configured to be connectable to the on-board vehicle electric system, the consumer, and the energy accumulator such that:
   in a first switching position, the energy accumulator is connected in parallel to the on-board vehicle electric system, and in a second switching position, the switching arrangement is connected in parallel to the on-board vehicle electric system;
wherein the energy accumulator in the second switching position is connected in series to the consumer and the energy accumulator in the first switching position is not connected in series to the consumer.

2. The motor vehicle according to claim 1, wherein at least one of the energy accumulator and the on-board vehicle electric system is switched into a normal operating state by switching the switching arrangement into the first switching position.

3. The motor vehicle according to claim 1, wherein at least one of the energy accumulator and the on-board vehicle electric system is switched into a pre-charging operating state by switching the switching arrangement into the second switching position.

4. The motor vehicle according to claim 2, wherein at least one of the energy accumulator and the on-board vehicle electric system is switched into a pre-charging operating state by switching the switching arrangement into the second switching position.

5. The motor vehicle according to claim 1, wherein the consumer further performs an additional vehicle-related function.

6. The motor vehicle according to claim 5, wherein the consumer comprises at least a component of a vehicle heater.

7. The motor vehicle according to claim 1, wherein the energy accumulator in a third switching position of the switching arrangement is separated from the on-board vehicle electric system.

8. The motor vehicle according to claim 4, wherein the energy accumulator in a third switching position of the switching arrangement is separated from the on-board vehicle electric system.

9. The motor vehicle according to claim 1, wherein the switching arrangement is switched into the second switching position via a vehicle wake-up signal.

10. The motor vehicle according to claim 7, wherein the switching arrangement is switched into the third switching position via a vehicle sleep signal.

11. The motor vehicle according to claim 1, wherein the switching arrangement is switched into the first switching position by a charging of the energy accumulator beyond a predetermined limit value.

12. The motor vehicle according to claim 1, further comprising a second switching unit by which the consumer can be connected in parallel to the on-board vehicle electric system.

13. The motor vehicle according to claim 12, wherein the switching arrangement and the second switching unit are operatively configured such that the consumer is not coupled in parallel to the on-board vehicle electric system simultaneously by the switching arrangement and second switching unit.

14. The motor vehicle according to claim 1, further comprising a consumer function indicator in the vehicle, the consumer function indicator being operatively configured for activation only if the electric consumer is activated based upon a user request.

15. The motor vehicle according to claim 1, further comprising a unidirectional direct voltage transformer operatively configured to discharge or diagnose the electric energy accumulator.

16. The motor vehicle according to claim 1, wherein a resistance of the electric consumer is non-linear such that a consumer current is limited to an allowable maximum value.

17. The motor vehicle according to claim 1, wherein the electric consumer is operatively configured to be spatially separate from the energy accumulator.

18. A method of operating a motor vehicle having an on-board vehicle electric system, an electric consumer whose resistance decreases over at least a subrange with a decreasing voltage dropping at the consumer, and an energy accumulator, the method comprising the acts of:
   operating a switching arrangement configured to be connectable to the on-board vehicle electric system, the consumer, and the energy accumulator such that:
      in a first switching position, the energy accumulator is connected in parallel to the on-board vehicle electric system;
      in a second switching position, the switching arrangement is connected in parallel to the on-board vehicle electric system; and
      in the second switching position, the energy accumulator is connected in series to the consumer and in the first switching position is not connected in series to the consumer.

19. The method according to claim 18, further comprising the act of switching the energy accumulator and the on-board vehicle electric system into a normal operating state by switching the switching arrangement into the first switching position.

20. The method according to claim 19, further comprising the act of switching the energy accumulator and the on-board vehicle electric system into a pre-charging operating state by switching the switching arrangement into the second switching position.

* * * * *